(12) United States Patent
Klingler et al.

(10) Patent No.: US 7,294,323 B2
(45) Date of Patent: *Nov. 13, 2007

(54) METHOD OF PRODUCING A CHEMICAL HYDRIDE

(75) Inventors: Kerry M. Klingler, Idaho Falls, ID (US); William T. Zollinger, Idaho Falls, ID (US); Bruce M. Wilding, Idaho Falls, ID (US); Dennis N. Bingham, Idaho Falls, ID (US); Kraig M. Wendt, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 697 days.

This patent is subject to a terminal disclaimer.

(21) Appl. No.: 10/778,789

(22) Filed: Feb. 13, 2004

(65) Prior Publication Data

US 2005/0180908 A1 Aug. 18, 2005

(51) Int. Cl.
*C01B 6/00* (2006.01)
*C01B 6/02* (2006.01)
*C01B 6/04* (2006.01)
*C01B 6/06* (2006.01)

(52) U.S. Cl. ...................... 423/288; 423/645; 423/646; 423/647

(58) Field of Classification Search ................ 423/288, 423/645, 646, 647
See application file for complete search history.

(56) References Cited

U.S. PATENT DOCUMENTS

| 4,397,925 | A | 8/1983 | Magahed |
| 4,492,741 | A | 1/1985 | Struthers |
| 4,636,445 | A | 1/1987 | Yamano et al. |
| 4,744,946 | A | 5/1988 | Sasai et al. |
| 4,808,282 | A | 2/1989 | Gregory |
| 4,904,357 | A | 2/1990 | Sharifian et al. |
| 4,931,154 | A | 6/1990 | Hale et al. |
| 5,298,037 | A | 3/1994 | Murphy et al. |
| 5,670,129 | A * | 9/1997 | Klapdor et al. ............. 423/645 |
| 5,728,464 | A | 3/1998 | Checketts |
| 5,804,329 | A | 9/1998 | Amendola |
| 5,817,157 | A | 10/1998 | Checketts |
| 5,997,821 | A | 12/1999 | Joshi |
| 6,221,310 | B1 | 4/2001 | Checketts |
| 6,235,235 | B1 | 5/2001 | Checketts |
| 6,578,362 | B1 | 6/2003 | Hanlon |
| 2003/0012717 | A1 * | 1/2003 | Agnew et al. ............. 423/179 |

FOREIGN PATENT DOCUMENTS

| CA | 2225978 | 6/1999 |
| EP | 1279641 | * 1/2003 |

* cited by examiner

*Primary Examiner*—Wayne A. Langel
(74) *Attorney, Agent, or Firm*—Wells St. John P.S.

(57) ABSTRACT

A method of producing a chemical hydride is described and which includes selecting a composition having chemical bonds and which is capable of forming a chemical hydride; providing a source of a hydrocarbon; and reacting the composition with the source of the hydrocarbon to generate a chemical hydride.

20 Claims, 1 Drawing Sheet

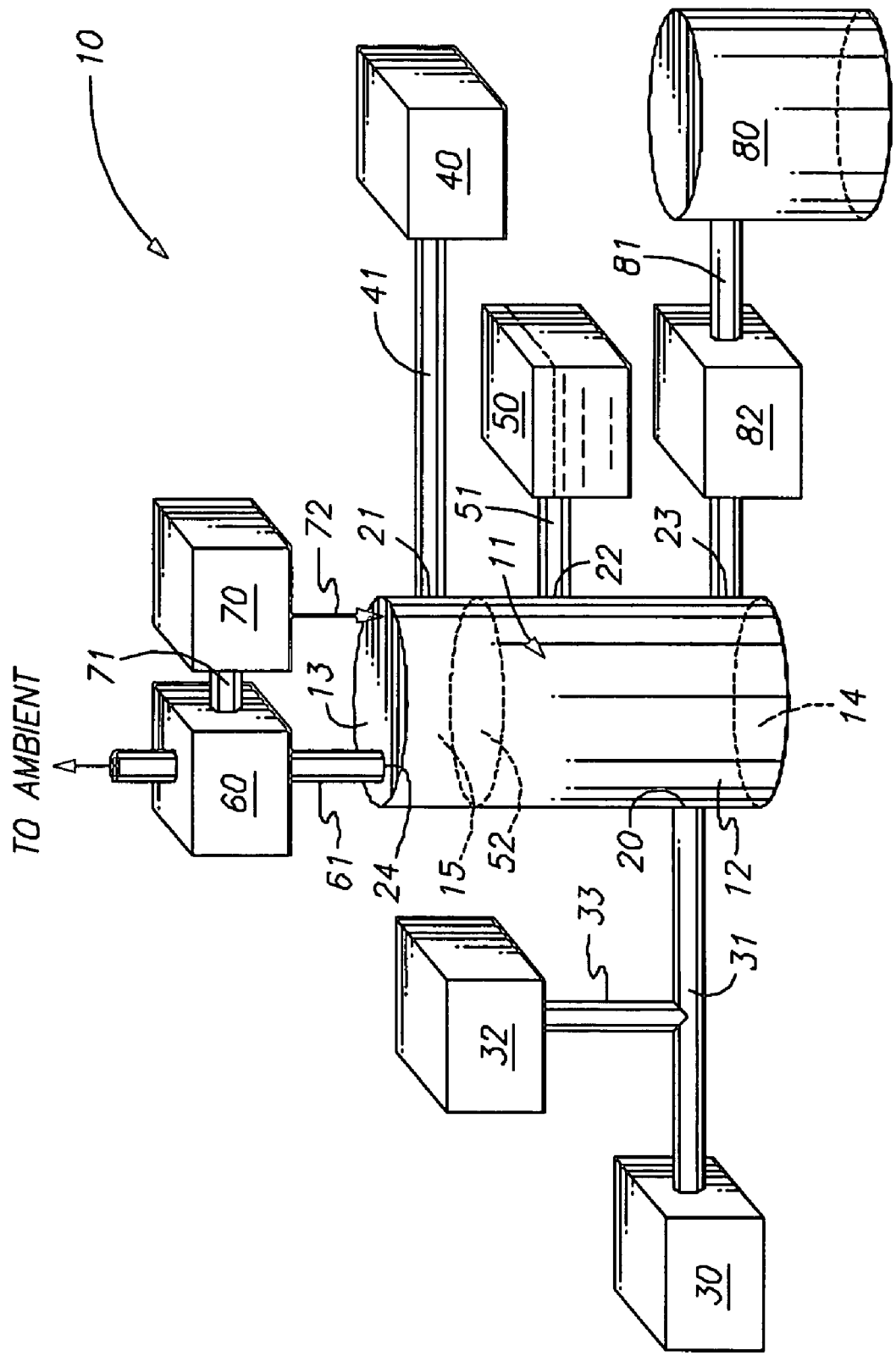

METHOD OF PRODUCING A CHEMICAL HYDRIDE

GOVERNMENT RIGHTS

The United States Government has certain rights in the following invention pursuant to Contract No. DE-AC07-99ID13727 between the U.S. Department of Energy and Bechtel BWXT Idaho, LLC.

TECHNICAL FIELD

The present invention relates to a method of forming a chemical hydride, and more specifically to a method of producing sodium borohydride from the reaction of borate with a source of a hydrocarbon such as methane.

BACKGROUND OF THE INVENTION

Researchers have long understood that hydrogen, as a fuel, is difficult to produce, store and dispense. Much research has been conducted to investigate the use of various hydride chemistries to store increasing amounts of hydrogen for use with various applications such as overland vehicle platforms, as well as fixed plant power production applications including the use of hydrogen as a fuel in fuel cells.

Hydride chemistry, as it is currently understood, appears promising as a potential storage medium for relatively large volumes of hydrogen. In this regard, these substances store energy in a chemical form, and also have the advantage of being recyclable in a subsequent chemical reaction by exposing the same, typically, to large amounts of electrical power in the presence of a catalyst. One of the more promising hydrides which has received much attention is that of sodium borohydride. When appropriately reacted, sodium borohydride releases hydrogen for use with various end use applications, and is converted in this chemical reaction to borate. It is known that the expended borate can be converted back to sodium borohydride in a subsequent high temperature pressurized electrolysis process. However, the current chemical process to convert the borate back to sodium borohydride is costly, energy intensive and inefficient. Consequently, the existing process is not economically viable in view of the current costs of commercially available fossil fuels.

A method of forming a chemical composition, such as sodium borohydride which avoids the shortcomings attendant with the prior art practices and methods utilized heretofore is the subject matter of the present application.

SUMMARY OF THE INVENTION

One aspect of the present invention relates to a method of producing a chemical hydride and which includes, selecting a composition having chemical bonds and which is capable of forming a chemical hydride; providing a source of a hydrocarbon; and reacting the composition with the source of the hydrocarbon to generate a chemical hydride.

Another aspect of the present invention relates to a method of producing a chemical hydride and which includes, providing a chemical reactor having a cavity which has a temperature and a pressure; providing a composition having chemical bonds which are capable of forming a chemical hydride, and supplying the composition to the cavity of the chemical reactor; providing a source of methane to the cavity of the chemical reactor; reacting the composition with the methane to produce the chemical hydride and other byproducts; and recovering the chemical hydride and the byproducts from the cavity of the chemical reactor.

Still another aspect of the present invention relates to a method for producing sodium borohydride which includes, providing a chemical reactor having a cavity and which has a temperature and a pressure; providing a source of sodium borate and supplying the sodium borate to the cavity of the chemical reactor; providing a source of methane and supplying the source of methane to the cavity of the chemical reactor; reacting the sodium borate in the cavity of the chemical reactor to produce sodium borohydride and other byproducts; controlling the temperature and pressure of the chemical reactor to facilitate the production of the sodium borohydride; providing a heater and supplying at least a portion of the byproducts produced by the chemical reaction of the sodium borate and methane to the heater, and combusting the byproducts in the heater to produce heat energy; supplying the heat energy derived from the combustion of the byproducts in the heater to the cavity of the chemical reactor; and recovering the sodium borohydride from the cavity of the chemical reactor.

These and other aspect of the present invention will be discussed in greater detail hereinafter.

BRIEF DESCRIPTION OF THE DRAWINGS

Preferred embodiments of the invention are described below with reference to the following accompanying drawings.

FIG. 1 is a greatly simplified schematic representation of an arrangement for practicing the present methodology.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

An arrangement which is useful in practicing the methodology of the present invention is shown in FIG. 1, and is generally indicated by the numeral 10. As seen in FIG. 1, the methodology includes providing a chemical reactor which is generally indicated by the numeral 11. The chemical reactor 11 is defined by a sidewall 12, and further includes a top surface 13, and a bottom surface 14 which are attached to the sidewalls and which define an internal cavity 15. The internal cavity in the present methodology has a selected temperature and pressure as will be discussed hereinafter. As seen in FIG. 1, first, second, third and fourth passageways or apertures 20, 21, 22, and 23, respectively are formed through the sidewall 12 and which couple the internal cavity 15 in fluid flowing relation relative to other assemblies which will be discussed hereinafter. Still further, an aperture or passageway 24 is formed in the top surface 13, and couples the internal cavity in fluid flowing relation relative to another assembly which will be described in the paragraphs below.

The method of producing a chemical hydride of the present invention includes a step of selecting a composition having chemical bonds and which is capable of forming a chemical hydride. A suitable composition of this nature includes sodium borate. The method of the present invention further includes a step of providing a source of the composition such as sodium borate 30 and supplying the sodium borate to the cavity 15 of the chemical reactor 11. The sodium borate travels along a first passageway 31 where it is later to be received within the cavity 15 of the chemical reactor 11.

The method of the present invention further includes a step of providing a source of a catalyst 32 which reacts with the chemical composition 30 and which facilitates the production of the desired chemical hydride. As seen in FIG. 1, the source of the catalyst 32 is coupled by means of the passageway 33 to the passageway 31 where the catalyst is mixed with the composition 30 having the desired chemical bonds, and which is capable of forming a chemical hydride. Together therefore the catalyst and the composition, which may include sodium borate, are delivered to the cavity 15 of the chemical reactor 11.

The method of the present invention 10 further includes, after the step of providing a source of borate 30, and supplying the source of the sodium borate to the cavity 11 of the chemical reactor 11, a step of providing a source of a hydrocarbon 40, such as methane, and supplying the source of methane to the cavity 15 of the chemical reactor 11 by way of a passageway 41. Once received within the cavity 15, the method further includes reacting the composition 30 having chemical bonds and which is capable of forming a chemical hydride with the source of the hydrocarbon, and further controlling the temperature and pressure of the chemical reactor 11 to optimize the production of the resulting chemical hydride. In the situation where the composition 30 comprises sodium borate, the resulting chemical hydride would comprise sodium borohydride as well as other byproducts.

The method of the present invention 10 further includes a step of providing a source of water 50, and chemically reacting the water with the composition 30 and the source of hydrocarbon 40 to further facilitate the production of a chemical hydride. As seen in FIG. 1, the source of water 50 is coupled by means of the passageway 51 in fluid flowing relation relative to the cavity 15 of the chemical reactor 11.

In the present method, as illustrated, the step of reacting the composition 30 which may include sodium borate, and the source of hydrogen, which may include methane 40, to produce a chemical hydride, such as sodium borohydride further produces additional byproducts which may include carbon monoxide. The method of the present invention further includes a step of providing a shift converter 60 and supplying the byproducts 52 which may include carbon monoxide to the shift converter. The shift converter 60 chemically converts the carbon monoxide to carbon dioxide which may then be released either to ambient, or further consumed by combustion in a burner which will be discussed below. The shift converter 60 is coupled by way of the passageway 61 to the cavity 15 of the chemical reactor 11.

As seen in FIG. 1, the method of the present invention 10 includes a step of providing a burner 70 and supplying, at least in part, a portion of the byproducts produced by the chemical reaction of the composition 30 with a source of hydrocarbon 40, as a fuel for use in the burner 70. As discussed above, the byproducts of this chemical reaction may include carbon monoxide, or carbon dioxide which has been converted from carbon monoxide, by means of the shift converter 60. The burner 70 is coupled by way of a passageway 71 to the shift converter 60. The byproducts 52 which are supplied to the burner 70 produce heat energy 72. The method of the present invention further includes a step of supplying the heat energy 72 produced by the burner 70 to increase the temperature of the composition 30, and the source of hydrocarbon 40 which is enclosed within the cavity 15 of the chemical reactor 11. The heat energy 72 produced by the burner is provided to the cavity 15 by various conventional means well known in the art. The temperature and pressure of the cavity 15 is maintained at greater then about −40° C., and greater than about ambient pressures, by other conventional means, (not shown). These temperatures and pressures facilitate the formation of the chemical hydride, such as sodium borohydride. This control scheme for controlling the temperature and pressure may include, but is not limited to conventional heaters, pumps, controllers, and sensors (not shown).

The method of the present invention further includes the step of recovering the chemical hydride 83 and the byproducts from the cavity 15 of the chemical reactor 11. In this regard, the step of recovering the chemical hydride, which may include sodium borohydride includes providing a recovery tank 80, and coupling the recovery tank 80 by means of a passageway 81 in fluid flowing relation relative to the cavity 15 of the chemical reactor 11 and further recovering the chemical hydride at a temperature of greater than about 20° C. A heater 82 may be provided along the passageway, and which is operable to heat the chemical hydride and other byproducts traveling along the passageway in order to drive off water and other byproducts which may be mixed with a chemical hydride that is being recovered.

OPERATION

The operation of the described embodiment of the present invention is believed to be readily apparent and is briefly summarized at this point.

As seen in FIG. 1, a method of producing a chemical hydride 10 of the present invention includes selecting a composition 30 having chemical bonds and which is capable of forming a chemical hydride, providing a source of a hydrocarbon 40; and reacting the composition 30 with the source of the hydrocarbon 40 to generate a chemical hydride.

Yet further, the present invention relates to a method of producing a chemical hydride which includes the steps of providing a chemical reactor 11 having a cavity 15 and which has a temperature and a pressure; providing a composition 30 having chemical bonds which are capable of forming a chemical hydride, and supplying the composition to the cavity 15 of the chemical reactor 11; providing a source of methane 40 to the cavity 15 of the chemical reactor 11; reacting the composition 30 with the methane 40 to produce the chemical hydride and other byproducts 52; recovering the chemical hydride and the byproducts 80 from the cavity 15 of the chemical reactor 11.

More specifically, the present invention relates to a method of producing sodium borohydride which includes the steps of providing a chemical reactor 11 having a cavity 15 which has a temperature and a pressure; providing a source of sodium borate 30 and supplying the sodium borate to the cavity 15 of the chemical reactor. Still further, the method includes providing a source of methane 40 and supplying the source of methane to the cavity 15 of the chemical reactor 11. The method further includes a step of reacting the sodium borate 30 in the cavity 15 of the chemical reactor 11 to produce sodium borohydride 83 and other byproducts 52. The method also includes the step of controlling the temperature and pressure of the chemical reactor to facilitate the production of the sodium borohydride. Still further, the method of the present invention includes the step of providing a heater 70 and supplying at least a portion of the byproducts 52 produced by the chemical reaction of the sodium borate 30 and methane 40 to the heater, and combusting the byproducts in the heater to produce heat energy 72. The method also includes the step of supplying the heat energy 72 derived from the combustion of the byproducts 52 in the heater to the cavity 15 of the chemical reactor 11. Finally, the present method includes the step of recovering the sodium borohydride 83 from the cavity 15 of the chemical reactor 11.

Therefore it will be seen that the method of producing a chemical hydride of the present invention provides a convenient means whereby a chemical composition having chemical bonds which are capable of forming a chemical hydride may be produced in a highly efficient fashion and which avoids the determents and shortcomings attendant with the earlier prior art practices.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method of producing a chemical hydride, comprising:
    selecting a composition having chemical bonds and which is capable of forming a chemical hydride;
    providing a source of a hydrocarbon;
    reacting the composition with the source of the hydrocarbon to generate a chemical hydride and produce additional byproducts;
    providing a burner, and supplying, at least in part, a portion of the byproducts produced by the chemical reaction of the composition with the source of the hydrocarbon as a fuel for use in the burner;
    combusting the byproducts in the burner to produce heat energy; and
    supplying the heat energy produced by the burner to increase the temperature of the composition and the source of the hydrocarbon.

2. A method as claimed in claim 1, and wherein after the steps of selecting the composition, and the source of the hydrocarbon, the method further comprises:
    providing a chemical reactor which has an internal cavity, and supplying the composition and the source of the hydrocarbon to the internal cavity of the chemical reactor to chemically react at a selected temperature and pressure; and
    controlling the temperature and pressure of the chemical reactor to optimize the production of the chemical hydride.

3. A method as claimed in claim 1, and wherein the step of reacting the composition with the source of the hydrocarbon further comprises reacting the composition with the source of the hydrocarbon at a temperature and pressure which facilitates the production of the chemical hydride.

4. A method as claimed in claim 3, and wherein the pressure is greater than ambient, and the temperature is greater than about −40° C.

5. A method as claimed in claim 1, and further comprising:
    providing a source of a catalyst which reacts with the composition and the source of the hydrocarbon to facilitate the production of the chemical hydride.

6. A method as claimed in claim 1, and further comprising:
    providing a source of water and chemically reacting the water with the composition and the source of the hydrocarbon to facilitate the production of the chemical hydride.

7. A method as claimed in claim 6, and wherein the step of reacting the composition with the source of the hydrocarbon further comprises reacting the composition, and the source of the hydrocarbon, at a temperature which facilitates the production of the chemical hydride, and wherein the method further comprises:
    recovering the chemical hydride produced from the reaction of the composition and the source of the hydrocarbon at a temperature which facilitates the removal of the water from the chemical hydride.

8. A method as claimed in claim 7, and wherein the chemical hydride is recovered at a temperature of greater than about 20° C.

9. A method as claimed in claim 1, and wherein at least one of the byproducts produced by the chemical reaction of the composition, and the source of the hydrocarbon, includes carbon monoxide, and wherein the method further comprises:
    providing a shift converter; and
    supplying the byproducts, which includes the carbon monoxide, to the shift converter, and wherein the shift converter chemically converts the carbon monoxide to carbon dioxide within the shift converter.

10. A method of producing a chemical hydride, comprising:
    providing a chemical reactor having a cavity which has a temperature and a pressure;
    supplying a source of sodium borate to the cavity of the chemical reactor;
    providing a source of methane to the cavity of the chemical reactor;
    reacting the source of sodium borate with the source of methane to produce the sodium borohydride and other byproducts; and
    recovering the sodium borohydride and the byproducts from the cavity of the chemical reactor.

11. A method as claimed in 10, and which further comprises:
    controlling the temperature and pressure of the chemical reactor.

12. A method as claimed in claim 11, and wherein the temperature of the chemical reactor is greater than about −40° C., and the pressure of the chemical reactor is greater than about ambient.

13. A method as claimed in claim 10, and further comprising:
    providing a burner, and supplying, at least in part, a portion of the byproducts produced by the chemical reaction of the sodium borate with the source of the methane, as a fuel for use in the burner;
    combusting the byproducts in the burner to produce heat energy; and
    supplying the heat energy produced by the burner to increase the temperature of the sodium borate and the source of the methane within the cavity of the chemical reactor.

14. A method as claimed in claim 10, and wherein at least one of the byproducts produced by the chemical reaction of the sodium borate, and the source of the methane, includes carbon monoxide, and wherein the method further comprises:

providing a shift converter; and supplying the byproducts, which includes the carbon monoxide, to the shift converter, and wherein the shift converter chemically converts the carbon monoxide to carbon dioxide within the shift converter.

15. A method as claimed in claim 10, and further comprising:

providing a source of water and supplying the source of water to the cavity of the chemical reactor;

reacting the source of water with the source of sodium borate, and the source of the methane; and removing the water from the sodium borohydride upon recovering the sodium borohydride from the chemical reactor.

16. A method as claimed in claim 15, and wherein the sodium borohydride is recovered at a temperature of at least 20° C.

17. A method for producing sodium borohydride, comprising:

providing a chemical reactor having a cavity which has a temperature and a pressure;

providing a source of sodium borate and supplying the sodium borate to the cavity of the chemical reactor;

providing a source of methane and supplying the source of methane to the cavity of the chemical reactor;

reacting the sodium borate in the cavity of the chemical reactor to produce sodium borohydride and other byproducts;

controlling the temperature and pressure of the chemical reactor to facilitate the production of the sodium borohydride;

providing a heater and supplying at least a portion of the byproducts produced by the chemical reaction of the sodium borate and methane to the heater, and combusting the byproducts in the heater to produce heat energy;

supplying the heat energy derived from the combustion of the byproducts in the heater to the cavity of the chemical reactor; and recovering the sodium borohydride from the cavity of the chemical reactor.

18. A method as claimed in claim 17, and wherein the temperature of the chemical reactor is greater than about 20° C., and the pressure of the chemical reactor is grater than about ambient.

19. A method as claimed in claim 17, and further comprising:

providing a source of a catalyst to the cavity of the chemical reactor to facilitate the chemical reaction of the sodium borate with the methane to produce the sodium borohydride.

20. A method as claimed in claim 17, and further comprising:

providing a source of water to the cavity of the chemical reactor to facilitate the chemical reaction of the sodium borate with the methane to produce the sodium borohydride, and wherein after the step of recovering the sodium borohydride, the method further comprises removing any water from the sodium borohydride.

* * * * *